United States Patent
Heinsohn

(10) Patent No.: US 12,017,493 B2
(45) Date of Patent: Jun. 25, 2024

(54) AIR SPRING AND VEHICLE COMPRISING THE AIR SPRING

(71) Applicant: Vibracoustic SE, Darmstadt (DE)

(72) Inventor: Christian Heinsohn, Hamburg (DE)

(73) Assignee: Vibracoustic SE, Darmstadt (DE)

( * ) Notice: Subject to any disclaimer, the term of this patent is extended or adjusted under 35 U.S.C. 154(b) by 146 days.

(21) Appl. No.: 17/671,967

(22) Filed: Feb. 15, 2022

(65) Prior Publication Data

US 2022/0258553 A1    Aug. 18, 2022

(30) Foreign Application Priority Data

Feb. 18, 2021    (DE) .......................... 102021103856.1

(51) Int. Cl.
| | | |
|---|---|---|
| *F16F 9/05* | (2006.01) | |
| *B60G 11/27* | (2006.01) | |
| *F16F 9/38* | (2006.01) | |

(52) U.S. Cl.
CPC ................ B60G 11/27 (2013.01); F16F 9/05 (2013.01); F16F 9/38 (2013.01); *B60G 2202/152* (2013.01); *B60G 2204/126* (2013.01); *B60G 2206/424* (2013.01); *F16F 2230/105* (2013.01)

(58) Field of Classification Search
CPC .............. B60G 11/27; B60G 2202/152; B60G 2204/126; B60G 2206/424; F16F 9/05; F16F 9/38; F16F 2230/105
See application file for complete search history.

(56) References Cited

U.S. PATENT DOCUMENTS

| | | | |
|---|---|---|---|
| 8,979,076 B2 | 3/2015 | Oldenettel | |
| 9,435,393 B2* | 9/2016 | Gleu | ......................... F16F 9/05 |
| 9,636,962 B2* | 5/2017 | Schallmeier | .......... F16F 9/0436 |
| 10,125,840 B2* | 11/2018 | Pniewski | ................ F16F 9/057 |
| 10,752,071 B2 | 8/2020 | Gleu et al. | |
| 11,267,305 B2* | 3/2022 | Jerisk | ..................... B60G 11/27 |

(Continued)

FOREIGN PATENT DOCUMENTS

| | | |
|---|---|---|
| DE | 1816597 U | 8/1960 |
| DE | 102009003829 A1 | 10/2010 |

(Continued)

OTHER PUBLICATIONS

German Office Action, DE 10 2021 103 856.1, dated Sep. 14, 2021.

*Primary Examiner* — Thomas W Irvin
(74) *Attorney, Agent, or Firm* — Fishman Stewart PLLC

(57) ABSTRACT

An air spring includes an air spring bellows extending along a longitudinal axis, an outer guide for the air spring bellows that extends at least partially around the air spring bellows and around the longitudinal axis, and a bellows extending at least partially around the air spring. In embodiments, the bellows includes a first bellows section and a second bellows section along the longitudinal axis, which extends at least partially around the outer guide. In embodiments, the bellows has, between the first bellows section and the second bellows section, a support configured for coupling to the outer guide, the support being mounted loosely on the outer guide in a first longitudinal axis direction and being decoupleable from the outer guide in a second longitudinal axis direction. The invention can provide, inter alia, an air spring with an increased lifespan.

12 Claims, 5 Drawing Sheets

(56) References Cited

U.S. PATENT DOCUMENTS

| | | | | |
|---|---|---|---|---|
| 11,707,960 B2* | 7/2023 | Pielock | ............... | F16F 9/54 |
| | | | | 267/64.11 |
| 2012/0112392 A1* | 5/2012 | Oldenettel | ............ | F16F 9/055 |
| | | | | 267/64.27 |
| 2015/0159725 A1* | 6/2015 | Gleu | ............... | F16F 9/084 |
| | | | | 267/64.24 |
| 2016/0075203 A1* | 3/2016 | Schallmeier | ........... | B60G 11/27 |
| | | | | 267/64.27 |
| 2016/0108985 A1* | 4/2016 | Pniewski | ............ | F16F 9/084 |
| | | | | 267/64.27 |
| 2019/0016187 A1* | 1/2019 | Gleu | ............... | B60G 11/27 |
| 2021/0170823 A1* | 6/2021 | Jerisk | ............... | F16F 9/0454 |
| 2021/0283967 A1* | 9/2021 | Pielock | ............ | B60G 15/14 |

FOREIGN PATENT DOCUMENTS

| | | |
|---|---|---|
| DE | 102016202642 A1 | 8/2017 |
| DE | 102016205741 A1 | 10/2017 |
| DE | 102016216911 A1 | 3/2018 |
| DE | 102017118112 A1 | 2/2019 |
| EP | 3408556 B1 | 7/2020 |

* cited by examiner

AIR SPRING AND VEHICLE COMPRISING THE AIR SPRING

CROSS-REFERENCE TO RELATED APPLICATIONS

This application claims priority to German Patent Application No. DE 10 2021 103 856.1, filed Feb. 18, 2021, the contents of which are hereby incorporated by reference in its entirety.

TECHNICAL FIELD

The invention concerns an air spring and a vehicle comprising an air spring.

BACKGROUND

Among other applications, air springs are used for the suspension of vehicles and car bodies. Air springs can have an air spring bellows that can roll on an outer guide with a rolling fold in order to change the length of the air spring. The outer guide can be arranged, for example, as a sleeve around part of the air spring bellows. To protect the air spring bellows and the outer guide from contamination, a protective cover surrounds at least the air spring bellows and the outer guide. This protective cover can, for example, be designed as a bellows.

Along a longitudinal axis of the air spring, installation space requirements can prevent the bellows from being provided with a corrugated geometry over the entire length of the air spring. The installation space requirements can result in a separation area radially on the outside of the outer guide of the air spring bellows, in which it is often not possible to arrange any folds on the bellows. The bellows thus has two areas separated by the separation area. An upper area is arranged close to the rolling pleats and a lower area is arranged far away from the rolling pleats.

In order to prevent canting, crushing or undefined frictional contact between the folds of the bellows and the outer guide during compression movements of the air spring, i.e. when the air spring bellows is compressed by a spring movement, for example, it is known from EP 3 408 556 B1 that the separating area of the bellows is fastened to the outer guide. However, in this case, deflection movements of the air spring are mainly absorbed by the upper section of the bellows. This can reduce the service life of the bellows.

SUMMARY

An object of the invention to provide an air spring that has an increased service life.

Features and embodiments of the invention are disclosed herein.

In an air spring comprising an air spring bellows extending along a longitudinal axis, an outer guide for the air spring bellows extending at least partially around the air spring bellows and around the longitudinal axis, and a bellows extending at least partially around the air spring bellows and having along the longitudinal axis a first bellows section and a second bellows section, which extends at least partially around the outer guide, it is provided for this purpose in accordance with the invention that the bellows has, between the first bellows section and the second bellows section, a bearing element for coupling to the outer guide, the bearing element being mounted loosely on the outer guide in a first longitudinal axis direction and being decoupleable from the outer guide in a second longitudinal axis direction.

In accordance with the invention, the bellows is only loosely mounted on the outer guide of the air spring bellows. The outer guide can be used to support a rolling fold of the air spring bellows during unrolling in a direction transverse to the longitudinal axis. In the first longitudinal axis direction, the bellows is supported by a support element (also referred to herein as a "support") on the outer guide. When the part of the air spring arranged at the second bellows section, which in an installed state may be fixed, for example, to a wheel axle, is moved along the second longitudinal axis direction, the part of the air spring arranged at the first bellows section, which in an installed state may be fixed, for example, to a body of a vehicle, being regarded as stationary with respect to the vehicle, the first bellows section is thus supported on the outer guide. The first bellows section can thus cushion a compression movement of the air spring. The first bellows section can be arranged in the vicinity of the roll fold of the air spring bellows. In the event of a spring-out movement in which the part of the air spring arranged on the second bellows section moves away along the first longitudinal axis direction from the part of the air spring arranged on the first bellows section, which is considered stationary in the installed state, the bellows can be decoupled from the outer guide due to the loose mounting. Thus, when the part of the air spring arranged on the second bellows section moves in the first longitudinal axis direction, and the part of the air spring arranged on the first bellows section is considered stationary, the outer guide may become detached from the first bellows section. In this way, the second bellows portion may contribute to deformation of the bellows during deflection movements. The first longitudinal axis direction and the second longitudinal axis direction are oriented opposite to each other and extend parallel to the longitudinal axis. In this case, the outer guide decouples from the support element during deflection movements so that the entire bellows can be deformed. This protects the first bellows section during deflection movements, since the first bellows section does not have to cushion the entire deflection movement in this direction. This increases the service life of the bellows. This also allows a shorter overall length to be provided for the first bellows section. Furthermore, this creates a defined contact surface between the outer guide and the bellows, enabling a slim design of the bellows and thus of the outer contour of the air spring. This further reduces local deformations on the bellows, and the overall height of the sleeve can be reduced.

Furthermore, the decoupling of the support element from the outer guide means that a fluid-communicating connection is provided between the first and second bellows sections within the bellows volume. Even when the support element rests on the outer guide, no seal is created between the first and second bellows sections, so that if the volume of the first bellows section changes, venting can take place by the second bellows section and vice versa.

In one example, the air spring bellows may be connected to an air spring piston via a roller fold. At the opposite end, the air spring bellows may be further closed with an air spring cover. The first bellows section may be attached to the air spring piston. Furthermore, the second bellows section can be connected to the air spring cover.

In accordance with an example, the bellows may further comprise a centering element between the first bellows section and the second bellows section for centering the outer guide in the second bellows section in a radial direction with respect to the longitudinal axis.

In this way, the centering element supports the second bellows section outward in the radial direction relative to the rest of the bellows. This ensures spacing between the bellows, outer guide and bellows in the radial direction, which reduces friction between the bellows and other components and thus increases its service life. The centering element can be attached to the support element, for example. Furthermore, the centering element can be a wall or a wall section of the bellows that connects the first bellows section with the second bellows section.

It is further possible for the air spring bellows to have, for example, an air spring bellows section extending in the first longitudinal axis direction, which is arranged outside the outer guide and is designed for cardanic and torsional motion.

This also allows the air spring to accommodate cardanic and torsional motion without being damaged. The second bellows section can, for example, be arranged on the air spring bellows section and moved by movements of the air spring bellows section itself.

In another example, the second bellows section may include at least one cuff region having a smooth wall and extending at least partially around the outer guide.

The sleeve area can have a diameter that is only slightly larger than the outer guide, so that at least in the area of the outer guide only little installation space is required for the air spring.

It is also possible that the second bellows section may, for example, have at least one section comprising a corrugated geometry along the longitudinal axis in cross-section to the longitudinal axis.

The corrugation geometry forms folds that extend around the longitudinal axis and support stretching or compression of the bellows in the second bellows section.

In accordance with another example, the outer guide may include a venting element (also referred to herein as a "vent") for venting the first bellows section when the outer guide is in contact with the support element.

Alternatively or additionally, the bellows can, for example, have a venting element for venting the first bellows section when the outer guide rests on the support element.

The venting element (or vent) provides a defined venting geometry for the bellows. In the event of a change in volume of the first bellows section due to compression or stretching, pressure compensation with the second bellows section can be improved in order to prevent damage to the bellows and to avoid generating additional spring resistance by compressing the air in the bellows. Flow noise during venting can also be reduced as a result.

It is further possible, for example, for the venting element to have at least one corrugation and/or, at least in sections, a contact geometry deviating from a corresponding geometry of the support element.

According to another example, the outer guide may comprise an end piece, wherein the support element is carried on the end piece.

The outer guide can extend away from the end piece. Further, the bellows contacts the outer guide only at the end piece. If the outer guide is designed as a sleeve, for example, the support element can rest on one end of the sleeve.

The first bellows section may further have, for example, a corrugated geometry along the longitudinal axis in cross-section to the longitudinal axis.

The corrugation geometry forms folds that extend around the longitudinal axis and support stretching or compression of the bellows in the first bellows section.

It is also possible that the outer guide can be attached to the air spring bellows by f a clamping ring.

This simplifies the installation of the outer guide on the air spring bellows and fixes the outer guide in a defined position on the air spring bellows.

Further, the invention relates to a vehicle comprising a body, at least one air spring according to the preceding description, and at least one wheel axle, wherein the air spring connects the wheel axle to the body.

Advantages and effects as well as further developments of the vehicle result from the advantages and effects as well as further developments of the air spring described above. Reference is therefore made in this respect to the preceding description.

BRIEF DESCRIPTION OF THE DRAWINGS

Further features, details and advantages of the invention are apparent from the wording of the claims and from the following description of embodiments based on the drawings.

DETAILED DESCRIPTION

Figure 1A:
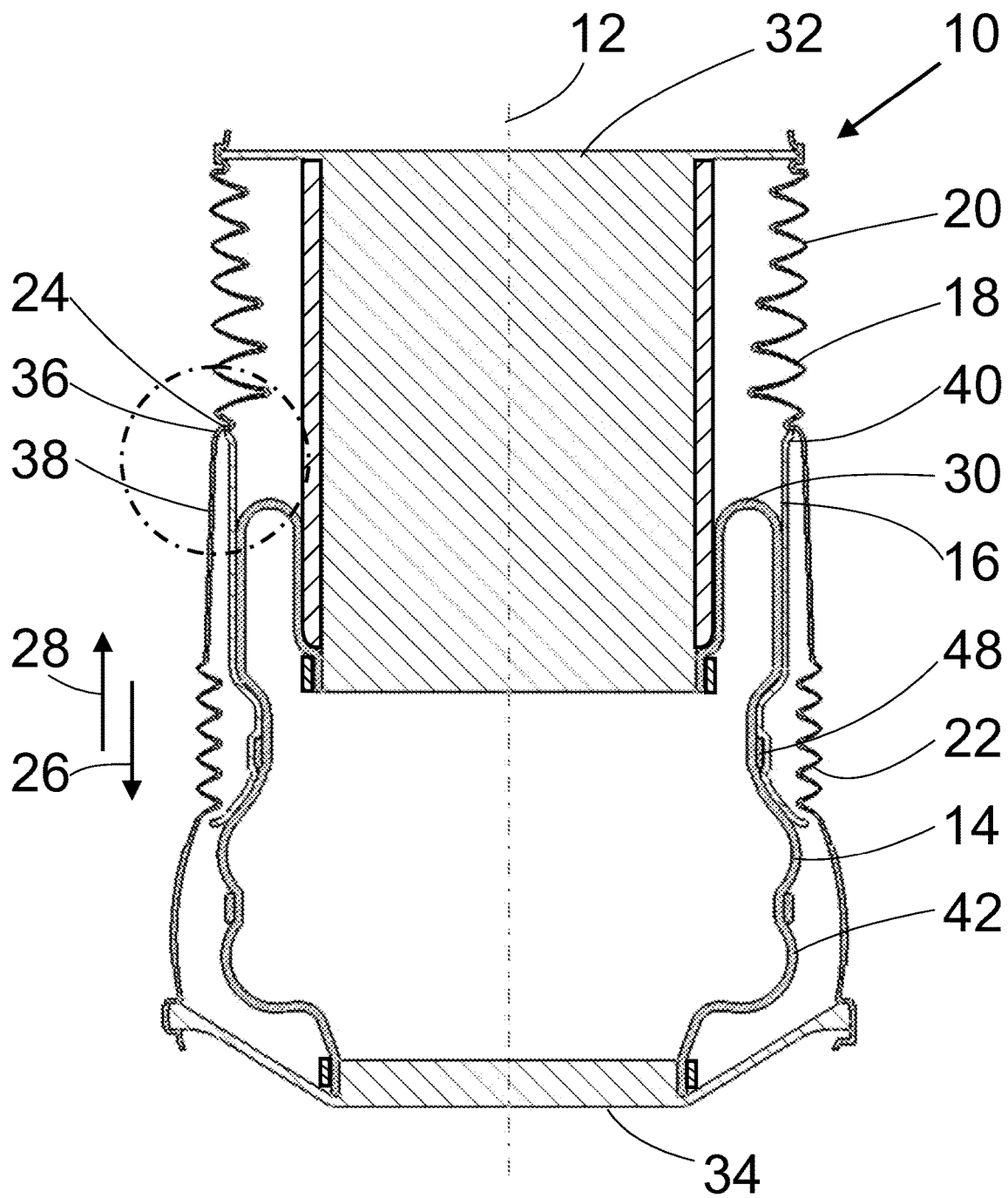
FIGS. 1a and 1b generally illustrate schematic sectional views of an air spring.

An air spring is referenced herein by reference numeral 10, such as indicated in FIG. 1a.

FIG. 1a shows a section through an air spring 10 according to an embodiment of the invention. The air spring 10 has a longitudinal axis 12, the air spring 10 extending along the longitudinal axis 12. Further, the air spring 10 comprises an air spring bellows 14, an outer guide 16 and a bellows 18.

The air spring bellows extends along the longitudinal axis 12 between an air spring piston 32 and an air spring cover 34. At the air spring piston 32, the air spring has a roll fold 30 with which a distance between the air spring piston 32 and the air spring cover 34 can be changed by the air spring bellows 14. For example, the roll fold 30 may be U-shaped and aligned with the air spring cover 34. Air spring piston 32, air spring bellows 14 and air spring cover 34 are arranged along the longitudinal axis 12.

The outer guide 16 extends around part of the air spring bellows 14. In this example, the outer guide 16 is fastened to the air spring bellows 14 by a clamping ring 48. Attachment to other components of the air spring 10 is not necessary. The outer guide 16 is designed so that the roll fold 30 of the air spring bellows 14 is supported on it in a radial direction with respect to the longitudinal axis 12. In the event of a change in volume of the air spring bellows 14, the roll fold 30 therefore rolls on the outer guide 16.

In this example, a further portion 42 of the air spring bellows 14 is free of the outer guide 16. In this further portion 42, the air spring bellows 14 can compensate for cardanic or torsional motions transmitted through the air spring cover 34.

Bellows 18 extends at least partially around air spring bellows 14 and outer guide 16. Bellows 18 has a first bellows section 20 and a second bellows section 22 and may be attached at one end to air spring cover 34 and at an opposite end to air spring piston 32.

The first bellows section 20 does not overlap with the outer guide 18 along the longitudinal axis 12 in this example. Further, the first bellows section 20 is disposed on the air spring piston 32 in an area of the air spring 10 where the roll fold 30 of the air spring bellows 14 can perform a length change.

The first bellows section 20 has at least one section that has a wave geometry along the longitudinal axis 12. The wave geometry extends in transverse section to the longitudinal axis 12 and forms folds in the first bellows section 20.

The second bellows section 22 extends at least partially around the outer guide 16, and is disposed in an area of the air spring 10 where the roll fold 30 of the air spring bellows 14 cannot cause a change in the length of the air spring 10. It may include a sleeve region 38 that extends a short distance around the outer guide 16. Further, the sleeve region 38 may be formed without wrinkles with a smooth wall so that the bellows 18 requires only a small increase in diameter in the region of the outer guide 10 to extend around the outer guide. This means that the bellows 18 can comply with small installation space requirements at this point.

A centering element 36 may be arranged on the sleeve region 38. The centering element 36 is used to center the outer guide 16 in the radial direction with respect to the second bellows section 22. This can prevent the support element 24 (also referred to herein as a "support") from slipping off the outer guide 16.

The centering element 36 and the support element 24 may be directly connected and/or integral with each other.

The second bellows section 22 has at least one section that has a wave geometry along the longitudinal axis 12. The corrugation geometry extends in cross-section to the longitudinal axis 12 and forms folds in the second bellows section 22.

Between the first bellows section 20 and the second bellows section 22, the bellows 18 includes a support element 24. The support element 24 can be mounted on an end piece 40 of the outer guide 16.

Figure 1B:
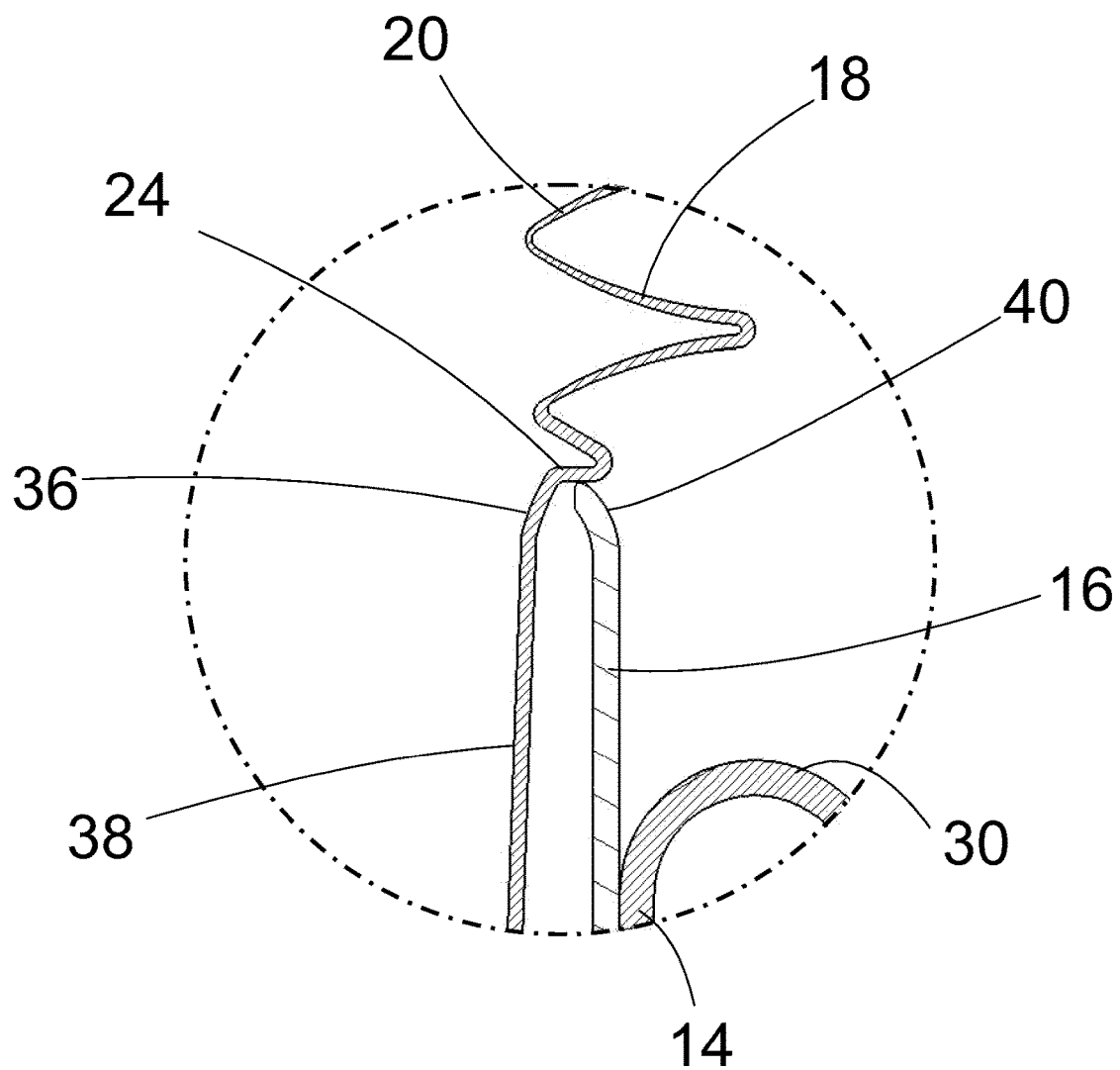

The support element 24 is configured to couple to the outer guide 16. As shown in the detailed illustration in FIG. 1b, the support element 24 is loosely mounted on the outer guide 16 along a first longitudinal axis direction 26, which in this example is directed from the air spring piston 32 in the direction of the air spring cover 34. Along a second longitudinal axis direction 28, which in this example is directed from the air spring cover 34 in the direction of the air spring piston 32, the support element 24 can be uncoupled from the outer guide 16.

The first longitudinal axis direction 26 and the second longitudinal axis direction 28 are oriented opposite to each other and extend parallel to the longitudinal axis 12.

Due to the bearing of the support element 24 on the outer guide 16 in the direction of the first longitudinal axis direction 26, when the air spring 10 is compressed, the air spring cover 34 is moved in the second longitudinal axis direction 28 with respect to the air spring piston 32, in which case an external force pushes the air spring piston 32 into the air spring bellows 14 and compresses the first bellows section 20 to compensate for the movement of the air spring piston 32.

In the event of a spring-out movement of the air spring 10, in which the air spring piston 32 is forced out of the air spring bellows 14 by an external force, the support element 24 may detach from the outer guide 16. Both the first bellows section 20 and the second bellows section 22 can compensate for the motion of the air spring piston 32 in this case. The first bellows section 20 is spared in this case, since it does not perform the compensation of the deflection movement alone. Instead, the second bellows section 22 makes a significant contribution to the length compensation in this case.

This distributes the deformation of the bellows 18 over a larger area than in the case where only the first bellows section 20 would compensate.

Furthermore, the decoupling of the support element 24 automatically creates a fluid-communicating connection between the volumes of the first bellows section 20 and the second bellows section 22. Thus, without further technical measures, an equalization of the air volume between the bellows sections 20, 22 can take place when the bellows 14 is stretched by a spring-out movement.

Figure 2:
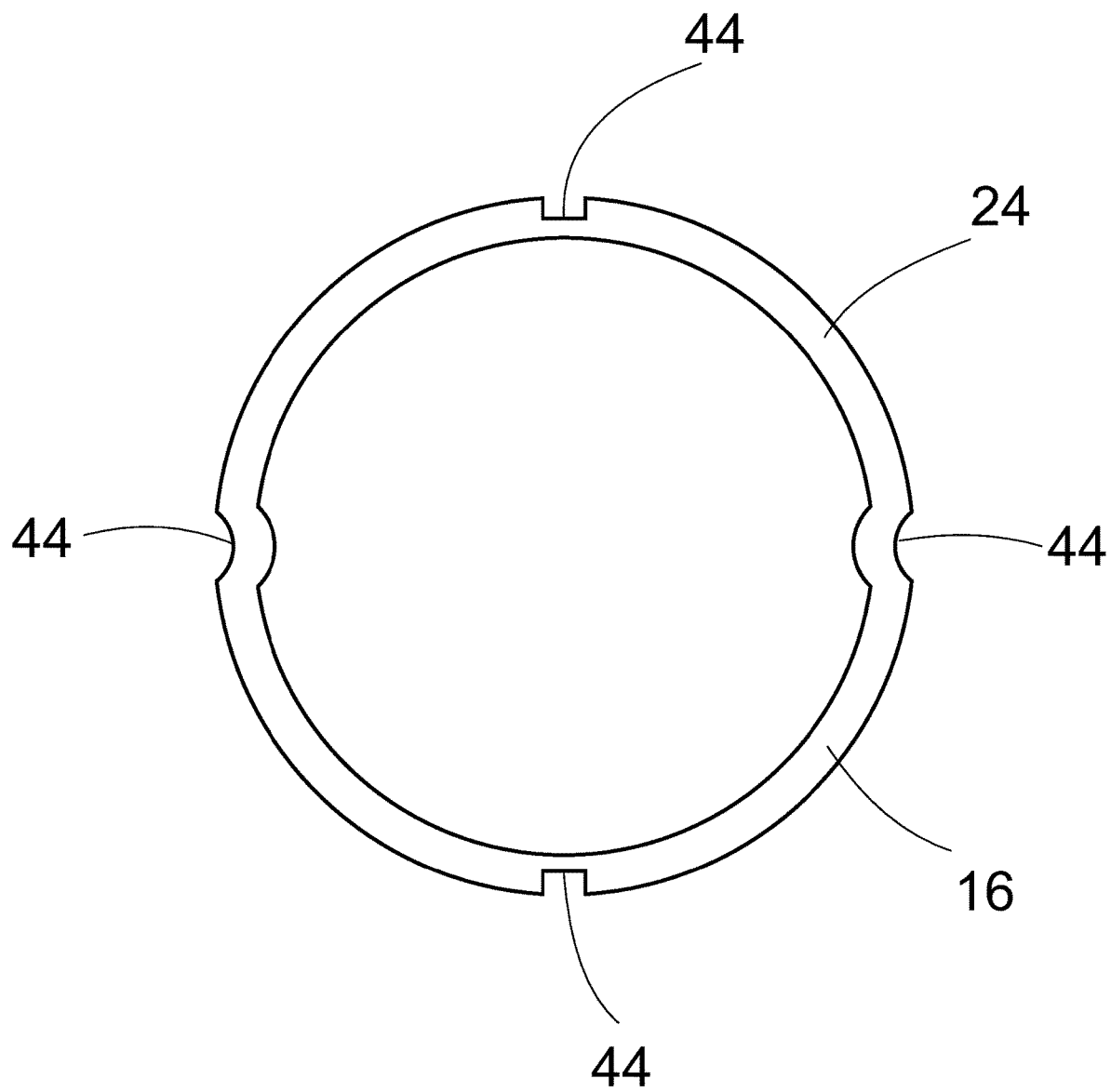
FIG. 2 generally illustrates a schematic representation of the external routing in a top view.

To compensate for the change in volume of the first bellows section 20 when the first bellows section 20 is compressed along the longitudinal axis 12, the outer guide 16 may include a ventilation element 44, as shown in FIG. 2.

The ventilation element 44 may be in the form of a bead or a groove. The bead or groove forms a channel between the volume of the first bellows section 20 and the volume of the second bellows section 22, allowing air to be exchanged between the first bellows section 20 and the second bellows section 22 when the support element 24 rests on the outer guide 16.

The ventilation element 44 may alternatively or additionally be formed by the outer guide 16 having a contact geometry for the support element 24 that differs from the corresponding geometry of the support element 24 (not shown).

The outer guide 16 may include multiple ventilation elements 44.

Figure 3:
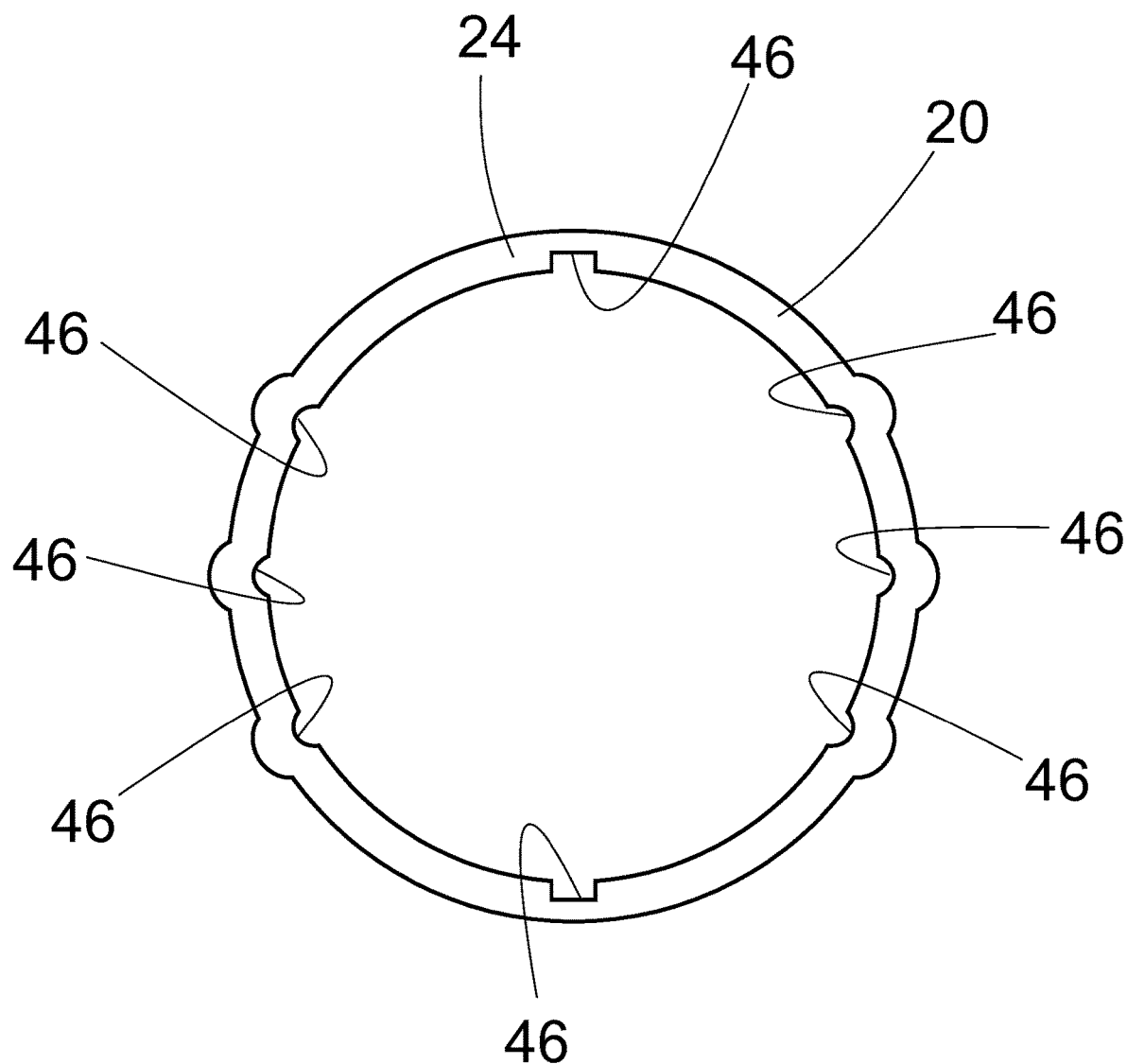
FIG. 3 generally illustrates a schematic representation of the support element in a plan view.

Referring to FIG. 3, the bellows 18 may include a ventilation element 46 configured to ventilate the first bellows section 20 when the outer guide 16 is in contact with the support element 24. Also in this example, the ventilation element 46 may be formed as a bead, in particular as an outwardly or inwardly directed bead. The outwardly directed bead acts as a channel between the first bellows section 20 and the second bellows section 22, while the inwardly directed bead acts as a spacer between the support element 24 and the outer guide 16, allowing air to be exchanged between the first bellows section 20 and the second bellows section 22 across the resulting gap. Further, the bellows 18 may include a plurality of venting elements 46.

Alternatively or additionally, the bellows 18 may have a geometry at the support element 24 that differs from a contact geometry of the outer guide 16 (not shown) so that air can be exchanged between the first bellows section 20 and the second bellows section 22.

Figure 4:
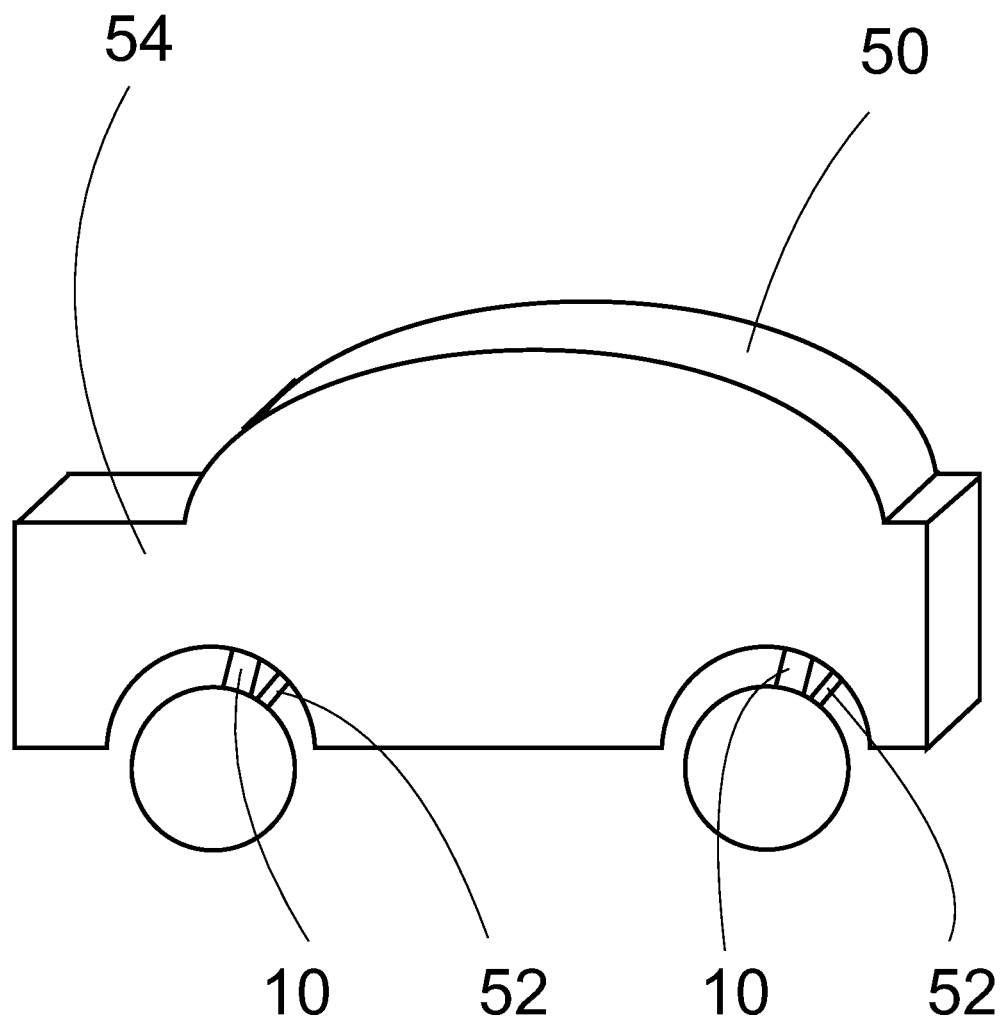
FIG. 4 generally illustrates a schematic representation of a vehicle with an air spring.

FIG. 4 shows a vehicle 50. The vehicle 50 comprises at least one wheel axle 52 and a car body 54. The wheel axle 52 is connected to the car body 54 by the air spring 10. The air spring 10 can thus dampen motions of the wheel axle 52 so that these are not transmitted to the car body 54.

The vehicle 50 can have several air springs 10. Each air spring 10 can be assigned to a different wheel axle 52.

The invention is not limited to any of the above-described embodiments, but can be modified in a variety of ways.

All features and advantages resulting from the claims, the description and the drawing, including constructional details, spatial arrangements and process steps, can be useful for the invention both individually and in the most diverse combinations.

The invention claimed is:

1. An air spring, comprising:
an air spring bellows extending along a longitudinal axis;
an outer guide for the air spring bellows, the outer guide extending at least partially around the air spring bellows and around the longitudinal axis; and
a bellows extending at least partially around the air spring, the bellows having, along the longitudinal axis, a first bellows section and a second bellows section extending at least partially around the outer guide;
wherein the bellows includes a support between the first bellows section and the second bellows section, the support is configured for coupling to the outer guide, and the support is mounted loosely on the outer guide in a first longitudinal axis direction and is decoupleable from the outer guide in a second longitudinal axis direction.

2. The air spring according to claim 1, wherein the bellows comprises a centering element between the first bellows section and the second bellows section, and the centering element is configured to center the outer guide in the second bellows section in a radial direction with respect to the longitudinal axis.

3. The air spring according to claim 1, wherein the air spring bellows has an air spring bellows section extending in the first longitudinal axis direction, which is arranged outside the outer guide and is configured for cardanic and torsional motion.

4. The air spring according to claim 1, wherein the second bellows section comprises at least one sleeve region having a smooth wall and extending at least partially around the outer guide.

5. The air spring according to claim 1, wherein the second bellows section has at least one section comprising a wave geometry along the longitudinal axis in cross-section to the longitudinal axis.

6. The air spring according to claim 1, wherein the outer guide comprises a vent for venting the first bellows section when the outer guide rests on the support.

7. The air spring according to claim 6, wherein the vent has at least one bead and/or, at least in sections, a contact geometry deviating from a corresponding geometry of the support.

8. The air spring according to claim 1, wherein the bellows has at least one vent for venting the first bellows section when the outer guide rests on the support.

9. The air spring according to claim 1, wherein the outer guide has an end piece, the support mounted on the end piece.

10. The air spring according to claim 1, wherein the first bellows section has a wave geometry along the longitudinal axis in cross-section to the longitudinal axis.

11. The air spring according to claim 1, wherein the outer guide is fastened to the air spring bellows by a clamping ring.

12. A vehicle comprising a car body, at least one air spring according to claim 1, and at least one wheel axle, wherein the air spring connects the wheel axle to the car body.

* * * * *